UNITED STATES PATENT OFFICE.

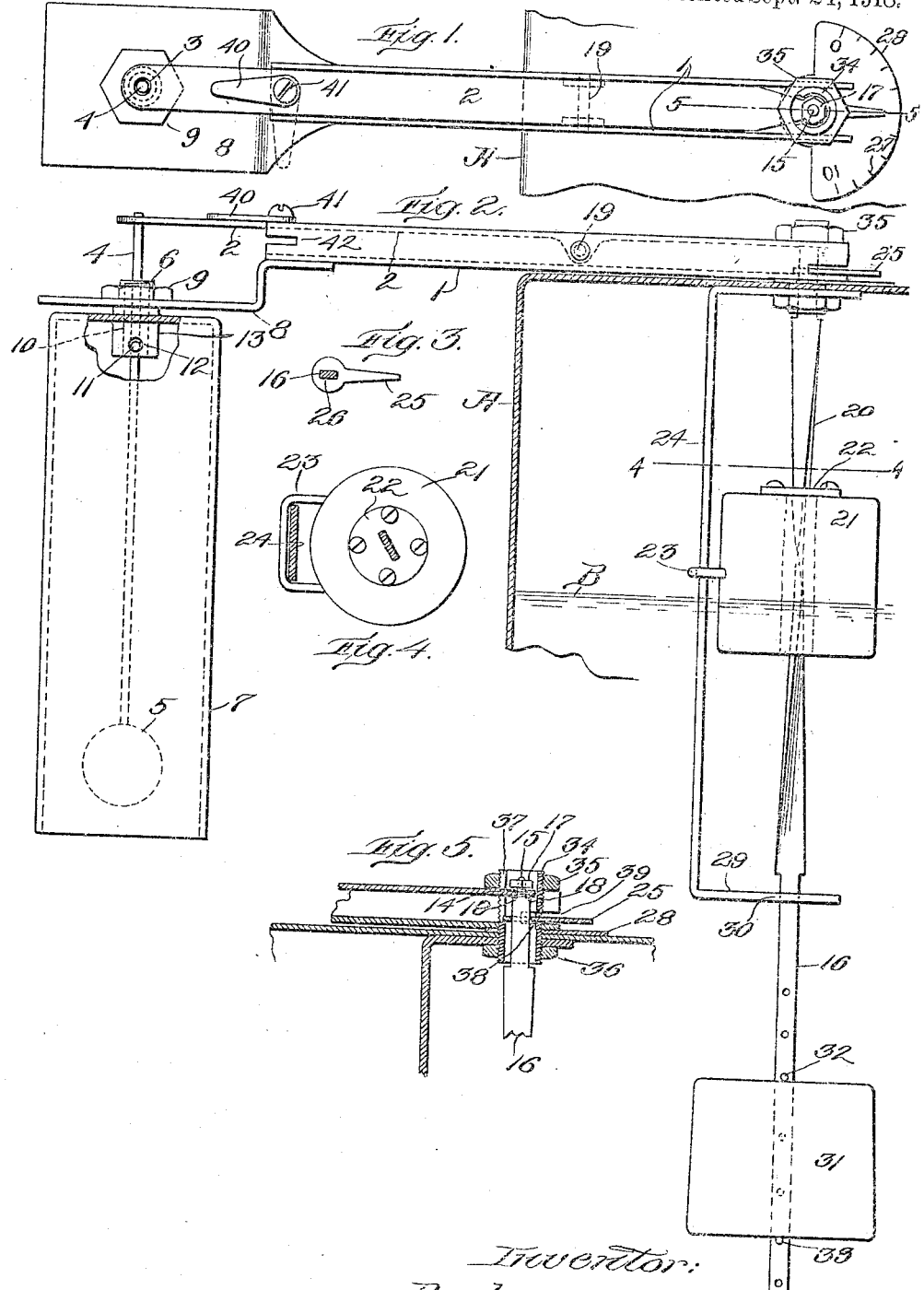

REUBEN A. GOODWIN, OF ATKINSON, NEW HAMPSHIRE.

LEVEL-INDICATOR AND SIGNAL.

1,280,015.

Specification of Letters Patent.

Patented Sept. 24, 1918.

Application filed August 29, 1917. Serial No. 188,732.

*To all whom it may concern:*

Be it known that I, REUBEN A. GOODWIN, a citizen of the United States, residing at Atkinson, in the county of Rockingham and State of New Hampshire, have invented certain new and useful Improvements in Level-Indicators and Signals, of which the following is a specification.

My invention relates to liquid level alarms such as are used in connection with a tank or reservoir to automatically produce an audible signal when the level of the liquid within said tank or reservoir falls below, or to, a predetermined height.

The object of my invention is to improve the construction and mode of operation of liquid level alarms of the class referred to and particularly to provide a simple and reliable structure which will include level indicating means which will at all times show the height of the body of liquid within the tank or reservoir, or otherwise indicate the quantity of liquid within said tank or reservoir.

In the accompanying drawings:

Figure 1 is a plan view of a portion of a tank or reservoir provided with my improved alarm and indicator.

Fig. 2 is a side elevation, partly in section, of the parts shown in Fig. 1.

Fig. 3 is a detail of the pointer or hand hereinafter described.

Fig. 4 is a section on line 4—4 of Fig. 2.

Fig. 5 is a section on line 5—5 of Fig. 1.

Having reference to the drawings, A represents a portion of a storage tank or reservoir holding a body of liquid B, and to the top of tank A is fastened a bracket 1 which may be made from a strip of sheet metal having its sides bent upwardly as shown so as to give to the bracket a U-shape in cross-section.

Within the bracket 1 is arranged a lever 2 formed at one end with a perforation 3 to coöperate with the stem 4 of the striker 5 of a bell 7. The bell 7 is made at its top with an exteriorly threaded extension projecting through an arm 8 rigidly secured to the bracket 1. A nut 9 screwed onto the extension 6 fastens the bell 7 rigidly to the arm 8. The stem 4 extends from the striker 5 upwardly through a hole 10 formed through the top of bell 7 and near its upper end said stem is provided with a transverse pin 11 loosely supported within a perforation 12 formed through a flange 13 surrounding hole 10 and upon the inside of the bell. The hole 10 is made sufficiently large so that when the stem is not restrained as hereinafter described, said stem is free to rock on pin 11 so that striker 5 can sound the bell. The opposite end of the lever 2 is formed with a perforation 14 through which extends the reduced threaded extremity 15 of a screw shaft 16, said threaded extremity loosely fitting the hole 14 and carrying a nut 17 between which and two shoulders 18 on shaft 16 the end of lever 2 is loosely confined. This connection between the lever 2 and shaft 16 provides for limited endwise movement of said shaft as well as rotary movement thereof relatively to the lever. It will be clear that when the shaft 16 is lowered the lever 2 will be swung on its fulcrum 19 in a direction to move its end away from the stem 4 and that when said shaft is raised the lever will be swung back against the end of stem 4.

The shaft 16 is made from a strip of sheet metal that has a portion 20 of its length twisted into a screw to receive upon it a float 21 carrying a nut 22 engaging said screw. The float 21 is held against rotating but can rise and fall with variations in the level of the liquid B. To hold the float 21 against rotating it is provided with a bail 23 embracing a bracket 24 secured to the top of tank A, said bail being free to slide up and down on said bracket. As will be clear vertical movement of float 21 serves to rotate the shaft 16.

Near its upper end the shaft 16 has a pointer or hand 25 mounted upon it, the hub of said pointer being formed with a slot 26 through which the shaft 16 extends and the free end of said pointer coöperating with a scale 27 marked to indicate gallons. The scale 27 is provided upon a plate 28 immovably clamped between the adjacent end of bracket 1 and the top of tank A.

The bracket 24 extends downwardly to a point below the screw 20 and at its lower end is provided with a laterally extending arm 29 formed with a hole 30 within which the lower portion of shaft 16 is rotatably mounted.

Mounted upon shaft 16 below the arm 29 is a float 31 held against endwise movement on said shaft by two pins 32 and 33. This float 31 normally occupies a position below the level of the liquid B and therefore the shaft 16 is normally held by said float at the limit of its upward movement with the end of lever 2 in engagement with the end of stem 4 so that the striker 5 cannot sound the bell 7. When, however, the level of the liquid falls sufficiently the float 31 and the shaft 16 that is supported by it, will be lowered and lever 2 moved out of engagement with the end of stem 4.

The apparatus herein shown is intended particularly for automobiles and the tank A may be the gasolene storage tank of the same. It will therefore be clear that the structure will be shaken and vibrated by the movements and vibrations of the vehicle so that when the lever 2 is disengaged from the stem 4 the striker 5 will be thrown against the sides of the bell 7, said stem 4 being free to swing in all directions on the pin 11.

When the supply of gasolene within tank A is replenished so that shaft 16 is returned to its uppermost position again, it may happen that the end of lever 2 is swung against the end of stem 4 on account of the hole 3 being out of register with the stem 4, but as soon as the vehicle is in motion again the movements imparted to the stem 4 cause the upper end of the latter to quickly find the hole 3.

The two brackets 1 and 24 may be fastened to the tank A in any suitable fashion. As herein shown I have provided for this purpose an exteriorly threaded tubular member 34 and two nuts 35 and 36. The nut 36 is applied to the lower end of the tubular member 34 and the latter extends upwardly therefrom through the bracket 24, the plate 28 and bracket 1 and has the nut 35 applied to its upper end, said nut 35 bearing against the tops of the side walls of bracket 1 and the two nuts being screwed up tight so as to clamp the parts tightly together. The tubular member 34 is cut away as at 37 to permit the end of lever 2 to reach the shaft 16 and as at 38 to accommodate the pointer 25 and allow the latter to swing through an arc of about 175 degrees. Also the adjacent ends of the side walls of the bracket 1 are slotted as at 39 to permit arm or pointer 25 to swing as described.

The alarm apparatus above described is of simple, durable and reliable construction and not only is an audible alarm sounded when the level of the liquid falls to a predetermined height, but the same apparatus shows at a glance the amount of liquid within the tank.

Upon the top side of the lever 2 near bell 7 is a latch 40 pivotally connected at 41 to said lever and adapted to be swung into the position indicated by dotted lines in Fig. 1 to engage with a slot 42 whereby the lever 2 may be locked in striker restraining position when desired.

What I claim is:

1. In a device of the character described, in combination, an indicator; an audible signal; a single member for operating the indicator and controlling the audible signal, and two floats connected with said member, one of said floats operating said member to work the indicator and the other float operating said member to control the signal.

2. A device of the character described comprising a shaft; means supporting said shaft with provision for rotary and endwise movement; a float connected with said shaft operating to move the latter endwise; a float connected with said shaft for rotating the latter; an indicator operated by movement of the shaft in one of said directions, and an audible signal controlled by movement of the shaft in the other of said directions.

3. A device of the character described comprising a shaft; means supporting said shaft with provision for rotary and endwise movement; a float connected with said shaft operating to move the latter endwise; a float connected with said shaft for rotating the latter; a visual indicator operated by rotary movement of the shaft, and an audible signal controlled by endwise movement of said shaft.

4. A device of the character described comprising a shaft; means supporting said shaft with provision for rotary and endwise movement; a float connected with said shaft for moving the latter endwise; a float connected with said shaft for rotating the latter; a pointer rotatable with said shaft; an index scale traversed by said pointer, and an audible signal controlled by endwise movement of said shaft.

5. A device of the character described comprising a shaft; means supporting said shaft with provision for rotary and endwise movement; a float connected with said shaft for rotating the latter as the level of the liquid rises and falls; a visual indicator operated by rotary movement of the shaft; a bell; and means through which endwise movement of said shaft controls the operation of said bell.

6. A device of the character described comprising a shaft; means supporting said shaft with provision for rotary and endwise movement; a float connected with said shaft for rotating the latter; a visual indicator operated by rotary movement of the shaft; a bell operated by movements transmitted to the device; and a float connected with said shaft by which the latter is moved endwise to control the operation of the bell.

7. A device of the character described comprising a vertical screw shaft; means supporting said shaft with provision for rotary and endwise movement; a float slidably mounted upon said shaft and movable lengthwise thereof to rotate said shaft; a float connected with said shaft so as to move the latter endwise; a pointer carried by said shaft; an index scale traversed by said pointer; a bell; a bell-striker operated by movements of the device, and a striker restraining member moved into and out of operative position by endwise movement of said shaft.

8. A device of the character described comprising a vertical screw shaft; means supporting said shaft with provision for rotary and endwise movement; a float slidably mounted upon said shaft and movable lengthwise thereof to rotate the same; a float disposed below the first float and connected with said shaft so as to move the latter endwise; a pointer connected with said shaft; an index scale traversed by said pointer; a bell; a bell-striker operated by movements of the device; a striker restraining member moved into and out of operative position by endwise movement of said shaft, and means through which said member may be secured in operative position when desired.

In testimony whereof I have affixed my signature.

REUBEN A. GOODWIN.

Copies of this patent may be obtained for five cents each, by addressing the "Commissioner of Patents, Washington, D. C."